United States Patent [19]

Macfie, Jr.

[11] 4,402,988

[45] Sep. 6, 1983

[54] FRUIT JUICE IMPREGNATED PLANTAINS

[75] Inventor: George B. Macfie, Jr., Oviedo, Fla.

[73] Assignee: A. Duda & Sons, Inc., Oviedo, Fla.

[21] Appl. No.: 361,038

[22] Filed: Mar. 23, 1982

[51] Int. Cl.³ .............................. A23L 3/00; A23L 1/00
[52] U.S. Cl. ................................ 426/335; 426/615; 426/281
[58] Field of Search ..................... 426/281, 335, 615

[56] References Cited

U.S. PATENT DOCUMENTS

| | | | |
|---|---|---|---|
| 2,647,838 | 7/1953 | Stone | 426/615 |
| 3,037,867 | 6/1962 | Daudin et al. | 426/335 |
| 3,620,765 | 10/1968 | McDonnell et al. | 426/312 |
| 3,843,810 | 10/1974 | Fehmerling | 426/615 |
| 4,049,837 | 9/1977 | Freebairn | 426/615 |

FOREIGN PATENT DOCUMENTS 994125  6/1965  United Kingdom ................ 426/335

OTHER PUBLICATIONS

Winton et al., The Structure and Composition of Foods, John Wiley & Sons, Inc. 1935, pp. 494-495.

*Primary Examiner*—Raymond N. Jones
*Assistant Examiner*—Marianne S. Minnick
*Attorney, Agent, or Firm*—Lalos, Leeds, Keegan, Lett & Marsh

[57] ABSTRACT

A plantain impregnated with fruit juice, particularly orange juice, having a unique taste and texture. Plantains are selected with ripeness such that the sugar content is derived from at least 70% conversion of the starch to sugar, peeling the plantains and then apply a high vacuum to the plantains. The plantains are then immersed in a solution of fruit juice. When the vacuum is released, the plantains are held immersed in the fruit juice for a sufficient dwell time. The impregnated fruit is then removed and it is frozen. The fruit prior to impregnation is desirably preserved from fungus attack by ripening the plantains in a low humidity of about a maximum of 40% relative humidity and/or contacting the plantains with a fungicide, such as that containing chlorine.

15 Claims, No Drawings

FRUIT JUICE IMPREGNATED PLANTAINS

BACKGROUND OF THE INVENTION

This invention relates generally to the process for treating fruits such as plantains to improve their taste and texture and enable them to be preserved as desired. More particularly the present invention is concerned with the process for treating plantains and the products produced thereby with a fruit juice that impregnates the plantain to produce a unique edible plantain product.

The plantain is a fruit belonging to the genus Musa and is related to the more widely known and more popular edible fruit, the banana. The plantain has generally been considered to be a stable in a diet of many people in South America and Caribbean countries. In appearance the plantain is similar to the banana and its growth characteristics, harvesting and propagation are substantially identical to that of the banana. However, its taste and texture differ from the banana to such an extent that typically the plantain is looked upon as a vegetable in a sense that it is only consumed by cooking a green or unripe plantain rather than in a fresh ripe form as with the banana. The reason for the plantain being consumed in an unripened cooked state rather than as a fresh ripe product is due to the flavor and texture of the plantain in its fresh ripe state. The external appearance of the ripe plantain is generally recognized to be yellow similar to that of a banana. An essentially black plantain, like an essentially black sinned banana is considered overripe. If the plantain were attempted to be eaten in a green or unripe state the flavor is even more unattractive and would meet even more limited acceptance when compared with the popular banana.

In spite of the recognized disadvantages, plantains have been an important food for many countries such as Puerto Rico where plantains may thrive in the mountains with the almost inaccessible terrain indigenous to Puerto Rico. The Puerto Rican economy would benefit significantly if there was an improvement in the food production and if the plantain could be made to utilize fully the otherwise non-arable land, the plantain could be important to the revitalization of Puerto Rico and other countries in Caribbean.

Before plantains could achieve the status of an important, if not vital, agricultural crop, the plantains would have to be available year round, but the plantain crop is typically harvested in the few months of late summer and early fall resulting in huge surpluses following harvest. Ideally, the plantains would be shipped as a food product to other geographic areas particularly the United States. To date, however, the United States consumption of plantains is insignificant because the flavor and texture characteristics of the plantain have not been accepted by the typical North American.

To improve the taste and texture of the plantains, additives were thought to be useful to make the plantains more palatable, however, the plantain in its typical unripe state did not accept additives, such as fruit juice, due to the substantially impenetrable outer tissue of the plantain. The tissue of the plantain in cross section is similar to a honeycomb wherein the contents of each cell within the honeycomb is generally maintained by a liner that varies in its porosity. The process of ripening the plantain promotes the action of enzymes which in addition to converting starch to sugar also have been found to make the cell walls more permeable. More importantly, the middle lamella is partially dissolved accounting for some of the softening of the ripening fruit. Attempts to impregnate the plantain with the fruit juice when the plantain is unripe would not produce the desirable impregnation. Impregnation tests conducted on plantains attempted to be impregnated with fruit juice tended to verify the supposition that the impregnation is viable only when the cell contents of a fairly high percentage of soluble material, as would be present when the plantain achieved a particular stage of ripeness. It appeared that in the unripe state, the cell wall membranes associated with the cell wall were impenetrable to dissolved solids contained in the fruit juice impregnate. While it is known that the ripening process involves an enzymatic change of starch to sugar the particular relationship between the stages of ripeness and impregnation were not recognized.

PRIOR ART

It is well known that various fruits have been impregnated by a vacuum process with various fluids. It is also known that the cells of various fruits contain gas pockets or vacuoles containing vapors that may be by-products of plant metabolism. In a vacuum process, the strong influence of the vacuum is presumed to permit the contents of these vacuoles to diffuse through the cytoplasmic membranes and cellulose walls of the cells to create a physiological imbalance of cell contents that is then rectified by substitution of the liquid impregnate.

Birdseye, U.S. Pat. No. 2,419,877, discloses the utilization of fruit juice as an impregnant for fruits under partial vacuum following dehydration of the fruit. By dehydrating the fruit initially, the vacuum process proceeds in a totally different fashion than if there was no dehydration.

Fehmerling, U.S. Pat. No. 3,843,810, discloses a process for the air evacuation of foods under ultra-low pressure. Also disclosed is the impregnation of various fruits through a vacuum process that extracts the most minute amount of oxygen remaining in the fruit in order to avoid detrimental effects upon the preservation and storage characteristics of the fruit. This patented process evacuated the air from the fruit immersed in a liquid by applying a low pressure at a maximum rate in stages down to a pressure of 2 to 13 mm of Hg and holding the vacuum for a dwell time of at least one hour and thereafter releasing the pressure slowly in stages in order to effect the complete removal of the entrapped gases and impregnate the fruit without damage to the cell structure.

Other vacuum impregnation methods are disclosed in Weckel U.S. Pat. No. 2,865,758, Fisher U.S. Pat. No. 2,801,925 and Guadagni U.S. Pat. No. 2,702,248.

OBJECTS OF THE PRESENT INVENTION

The principal object of the present invention is the production of a new and unique plantain products of acceptable flavor and texture.

It is also an object of the present invention to provide a process for impregnating plantains with fruit juice to impart a desirable flavor and texture to the impregnated plantain.

It is a further object of the present invention to provide a process for producing a unique impregnated plantain product through the selection of plantains having ripeness characteristics that enable the impregnation to occur.

Another object of the present invention is the provision of a method for producing a plantain impregnated with fruit juice, such as orange juice, and thereafter freezing the juice impregnated plantain.

This invention also has as an object the provision of a procedure for the complete impregnation of high concentrations of fruit juice into plantains that have been ripened to a preselected extent generally recognized as uselessly overripe and yet which have the capability of withstanding storage without degradation.

Another important object of the present invention is the provision of a plantain product impregnated with orange juice after the plantain has attained preselected conversion of starch to sugar in order to achieve the maximum impregnation with orange juice.

A further object of the present invention is to produce a unique impregnated plantain product from a preselected overripened plantain, and yet avoid the occurrence of fungus or mold on the plantain prior to impregnation through control of the humidity of the ripening environment, or by reason of a fungicide.

In its broadest aspects, the present invention has as an object the production of a unique plantain product impregnated with orange juice that is frozen to produce an edible product for sale and distribution in North America, South America, Central America and Caribbean countries so as to promote and develop the use of plantain as an important agricultural product.

These and other objects of the present invention will become apparent after careful study of the following specification and claims.

SUMMARY OF THE INVENTION

It was discovered that a plantain can be impregnated with fruit juice particularly orange juice to produce a unique product having both desirable taste and texture characteristics by selecting plantains having a ripeness such that the sugar content is derived from at least a 70% conversion of the starch to sugar, peeling the plantains and then applying at least a 29 inch vacuum to the plantains for at least 10 seconds. The plantains are then immersed in a solution of fruit juice for a time sufficient to initiate impregnation of the plantains with the fruit juice. When the vacuum is released the plantains are held immersed in the fruit juice for a dwell time of at least 10 seconds when the impregnated fruit is removed for freezing and storage. The fruit prior to impregnation may be preserved from fungus attack by ripening the plantains in a low humidity of about a maximum of 40% relative humidity and/or contacting the plantains with a fungicide, such as that containing chlorine.

DESCRIPTION OF THE INVENTION

It has been determined that significant improvement in the utilization of plantains is possible if the plantains are impregnated with fruit juice, particularly orange juice. The impregnated plantain so produced is then capable of entering new geographical markets resulting in a valuable agricultural product that would have a positive effect upon the economy of a number of the Caribbean countries, particularly Puerto Rico.

To achieve this significant increase in the production and utilization of plantains, the impregnation with fruit juice, particularly orange juice, must result in substantially complete penetration in order to obtain the flavor and texture found more palatable to a wider range of peoples in North America. To achieve this substantially complete penetration of the fruit juice into the plantain was a problem that was not solvable from a knowledge of the prior art. Moreover, the product even when impregnated must be stored satisfactorily to permit transportation to areas of distribution. It is this storage requirement that could not be met with prior art processed and impregnated plantains because of a natural growth of fungus that would attack the impregnated plantain producing not only an unappetizing taste but also an unappealing appearance.

It was thus discovered that plantain products to be successfully marketed to meet the production requirements must be not only impregnated with fruit juice in a specific manner but also must meet minimal storage requirements in order to inhibit the growth of fungus that would destroy the appetizing and appealing characteristics of the impregnated plantain.

It was discovered that the process of the present invention can only successfully take place with plantains of a specified minimal over-ripeness compared to the recognized ripe stage showing a yellow color. Numerous experiments have proven that complete or nearly complete conversion of the starchy constituents of the fruit to sugar is essential. Such ripening produces cell contents of the plantain having a fairly high percentage of soluble material. The enzymatic change of starch to sugar inherently and naturally occurring in the ripening process causes the starch, as the principal cell carbohydrate present in the green state of the plantain, to be converted to sugar. It was discovered that, at this advanced stage of ripening, generally recognized as overripening, the cell contents of the outer membranes of the plantain change from insoluble, impenetrable barriers against impregnation to soluble cell contents, and more a penetrable membrane permitting the dissolved solids of the impregnant to enter the cells.

It has been discovered that it is important to the successful impregnation of the plantains initially to select ripe fruit wherein the sugar content is at least 70% converted from starch to sugar, and preferably, at least 85% to 90% by weight converted from starch or other carbohydrates to sugar. In this stage, the impregnant such as orange juice can be forced through the epidermal or abscission layer of a ripe plantain.

The ripeness of the fruit that meets this requirement, of at least 70% conversion of the starch to sugar, is typically recognizable by those skilled in the art as overripe. Thus, the specified overripeness of the fruit produces a soft, putty-like feel that is quite pronounced and easily determined by the experienced worker. The color of the fruit that is sufficiently ripe to meet the requirements of the present invention is dark exhibiting an essentially black external appearance. If necessary, experimental testing to determine the amount of residual starch may be made initially, or at any time with a penetrometer or other suitable means but as stated previously, those skilled in the art would be readily able to detect an essentially fully ripe plantain.

The ripening of the plantain may be achieved in any conventional manner either naturally or accelerated. Accelerated methods of ripening plantain utilizing ethylene gas are well known and have been described in patents such as McDonnell, U.S. Pat. No. 3,620,765 and Burg, U.S. Pat. No. Re. 28,995. In either method of ripening, whether naturally or accelerated, it has been found that the texture of the overripe fruit attains the soft putty-like feel characteristic of the fully ripe fruit, and also, the essentially black external color of the epidermal layer, but it has been found that such overripening typically produces an undesirable fungal condition in which the plantains are covered with a reddish, greyish or blackish fungus that is not present in the merely ripe state. This fungus limits the usefulness of the plantains, but it has been discovered that this fungus can be controlled in either of two methods or a combination of both.

When the plantains are ripened with acceleration, the ethylene ripening gas is introduced into a ripening room containing the plantain preferably within 2 to 24 hours after harvesting. There the initiation of the ripening of the unripe fruit may begin at a temperature between 65° F. and 95° F. when held for a time between 10 and 72 hours while forcing a moving gaseous atmosphere containing 0.5 to 30,000 p.p.m. ethylene into continuous contact with the plantains. The ripening of the plantain may be achieved at a fruit temperature of about 66° F. to 85° F. in 3 to 5 days. Known prior art methods would include a 90 to 95% R.H. during such accelerated ripening to a ripe stage, but to achieve the overripeness of this invention, the plantains develop a fungus.

In order to avoid the inherent fungus build-up, it has been discovered that precautions to prevent the fungus from attacking the plantains can be achieved by performing the accelerated ripening at a very low humidity of a maximum 40% R.H. More preferably, the relative humidity should be in the range of 25% to 40% relative humidity to prevent the mold or fungus build-up.

Even with the low humidity accelerated ripening, the fungus may still grow subsequent to the ripening unless the plantains so ripened proceed immediately to the impregnation step. To avoid the possible build-up of this fungus or mold due to any unexpected delays in the impregnation, a fungicide dip is particularly desirable and should be used to treat the plantains within a few hours up to a day after harvesting if the plantains are to be ripened naturally which could take 5 to 10 days preferably about 6 to 9 days at temperatures about 65° F.

The fungicide may be made to contact the plantain either by dipping or spraying a composition that is conventional and contains any well-known fungicide, such as a chlorine containing composition well known to those skilled in the art. A 100–200 p.p.m. composition of chlorine in an aqueous solution would be adequate to meet the requirements to prevent the growth of fungus on the plantains. The fungicide dip may be used alone when undertaken shortly after harvest if the plantains are being ripened naturally, or the fungicide may be applied prior to the accelerated ripening, even if the artificial ripening is achieved in the ethylene environment at low humidity as set forth above. In such instance, the fungicide treatment would tend to permit a delay in proceeding to the impregnation step after the plantation have been fully ripened by accelerated means.

At this stage of the process the plantains are almost black in color and the starch has been at least 70% converted to sugar so that the cell contents of the plantain are soluble and penetrable by the dissolved solids of the impregnant. The desirable impregnant for the purposes of the present invention is fruit juice, particularly orange juice.

The ripened plantain is impregnated with orange juice after the skin is peeled from the plantains. The peeled plantains are placed in an enclosed environment preferably in a perforated container above the volume of orange juice. The vacuum is drawn to at least 29 inches of Hg or greater. Preferably, the amount of vacuum would be about 3 to 4 mm of Hg. More preferably, the particular vacuum found desirable would be 5 to 6 mm of Hg. The time that the vacuum is to be applied before the plantain is to be immersed in the orange juice ranges from 10 seconds to one minute, but preferably, about 30 to 40 seconds during which time much of the entrapped gas within the cells has been removed. Thereafter, the plantain is immersed in the orange juice by lowering the perforated bucket containing the plantain, and after immersion, the vacuum is broken to the atmosphere. The plantains are to remain immersed in the orange juice for a time that is preferably at least 10 seconds, but more preferably, at least one minute to 5 minutes or more during which time the fruit juice is completely impregnated within the plantain.

Upon removal from the orange juice the plantain is found to be substantially completely impregnated and is then frozen. The freezing temperature is not critical although preferably it is in the range of 0° F. to minus 20° F. to lower temperatures.

The product produced from the ripe plantain impregnated with orange juice is then found to have a texture that is pleasing to the palate and a taste that is very acceptable when compared to the bland, tasteless plantain previously marketed.

The invention as above described is believed to meet the objects set forth and should only be limited in scope by the following claims.

I claim:
1. The process of impregnating plantains with fruit juice comprising:
   selecting plantains having a sugar content derived from at least a 70% conversion of starch to sugar,
   peeling said plantains,
   applying at least a 29 inch vacuum to said plantains for at least 10 seconds,
   immersing said vacuum treated plantains in a solution of fruit juice for a time sufficient to initiate impregnation of said plantains with said fruit juice,
   releasing said vacuum and thereafter holding said plantains immersed within said solution for a dwell time of at least 10 seconds,
   removing said fruit juice impregnated plantain from said immersion, and
   freezing the juice impregnated plantain.
2. The process of claim 1 including, said plantain having at least 85% conversion of starch to sugar.
3. The process of claim 1 including, said plantain being essentially black in external coloring and of soft texture.
4. The process of claim 1 including, artificially ripening said plantain in a low humidity of about a maximum of 40% R.H.
5. The process of claim 1 including, controlling fungus growth on said plantains before applying said vacuum by contacting said plantains with a fungicide.
6. The process of claim 5 including, applying said fungicide within 2 to 24 hours of the time of harvest.
7. The process of claim 1 including, the dwell time being between 10 seconds and one minute.
8. The process of claim 1 including, said dwell time being between 30 to 40 seconds.
9. The process of claim 1 including, said plantain having at least 85% conversion of starch to sugar,
   said plantain being essentially black in external coloring and of soft texture, and artificially ripening said plantain in a low humidity of about a maximum of 40% R.H.

10. The process of claim 9 including, said plantain having at least 85% conversion of starch to sugar,
said plantain being essentially black in external coloring and of soft texture,
controlling fungus growth on said plantains before applying said vacuum by contacting said plantains with a fungicide, and
applying said fungicide within 2 to 24 hours of the time of harvest.

11. The process of claim 1 including, said plantain having at least 85% conversion of starch to sugar,
said plantain being essentially black in external coloring and of soft texture,
artificially ripening said plantain in a low humidity of about a maximum of 40% R.H., and
the dwell time being between 10 seconds and one minute.

12. The process of claim 1 including, said plantain having at least 85% conversion of starch to sugar,
said plantain being essentially black in external coloring and of soft texture,
artificially ripening said plantain in a low humidity of about a maximum of 40% R.H., and
said dwell time being between 30 to 40 seconds.

13. The process of claim 11 or 12 wherein, said fruit juice is orange juice.

14. The product resulting from the process of claim 1.

15. The product resulting from the process of claim 13.

* * * * *